US011267395B2

(12) United States Patent
Iwaki et al.

(10) Patent No.: US 11,267,395 B2
(45) Date of Patent: Mar. 8, 2022

(54) INFORMATION DISPLAY SYSTEM

(71) Applicant: Yazaki Corporation, Tokyo (JP)

(72) Inventors: Takahiro Iwaki, Shizuoka (JP); Naoshi Serizawa, Shizuoka (JP); Tatsuya Ishikawa, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/690,859

(22) Filed: Nov. 21, 2019

(65) Prior Publication Data

US 2020/0207262 A1    Jul. 2, 2020

(30) Foreign Application Priority Data

Dec. 26, 2018 (JP) .............. JP2018-242217

(51) Int. Cl.
| | |
|---|---|
| *B60Q 1/50* | (2006.01) |
| *B60R 11/02* | (2006.01) |
| *G06F 3/14* | (2006.01) |
| *B60R 11/00* | (2006.01) |
| *B62D 35/00* | (2006.01) |
| *H01Q 1/32* | (2006.01) |

(52) U.S. Cl.
CPC .......... *B60Q 1/503* (2013.01); *B60R 11/0229* (2013.01); *G06F 3/14* (2013.01); *B60R 2011/004* (2013.01); *B60R 2011/0043* (2013.01); *B62D 35/007* (2013.01); *H01Q 1/3291* (2013.01)

(58) Field of Classification Search
CPC ....... B60Q 1/503; G06F 3/14; B60R 11/0229; B60R 2011/004; B60R 2011/0043; B62D 35/007; H01Q 1/3291

USPC .............. 340/425.5, 539.1, 539.11
See application file for complete search history.

(56) References Cited

U.S. PATENT DOCUMENTS

| | | | | |
|---|---|---|---|---|
| 5,825,281 A * | 10/1998 | McCreary | ............ | B60Q 1/2611 340/425.5 |
| 6,124,647 A * | 9/2000 | Marcus | ............... | B60C 23/0401 307/10.1 |
| 2005/0253699 A1* | 11/2005 | Madonia | ............... | B60K 37/06 340/463 |

(Continued)

FOREIGN PATENT DOCUMENTS

| | | |
|---|---|---|
| GB | 2270587 A | 3/1994 |
| JP | 2007-320339 A | 12/2007 |

(Continued)

*Primary Examiner* — Daryl C Pope
(74) *Attorney, Agent, or Firm* — Sughrue Mion, PLLC

(57) ABSTRACT

The information display system includes an antenna, a display unit, a processing unit, and a housing. The antenna receives outside information from an outside of a vehicle. The display unit performs display to the outside of the vehicle. The processing unit is capable of executing outside-targeted display processing by which to cause the display unit to perform display associated with the outside information by controlling the display unit based on the outside information received by the antenna. The housing is installed on the vehicle after having the antenna, the display unit, and the processing unit assembled thereto and thus unitized. As a result, the information display system produces the effect of enabling beneficial information to be provided to the outside of the vehicle.

8 Claims, 4 Drawing Sheets

(56) References Cited

U.S. PATENT DOCUMENTS

| | | | |
|---|---|---|---|
| 2009/0134984 | A1 | 5/2009 | Chen |
| 2011/0258895 | A1 | 10/2011 | Rodgers, Jr. |
| 2012/0038489 | A1* | 2/2012 | Goldshmidt ........... G08G 1/166 340/903 |
| 2014/0005860 | A1* | 1/2014 | Chance ................ B60Q 1/2615 701/2 |
| 2014/0043156 | A1* | 2/2014 | Howk, Jr. .............. B60Q 1/503 340/468 |
| 2015/0194082 | A1 | 7/2015 | McEwan |
| 2016/0278065 | A1* | 9/2016 | Kim .................... H04W 72/046 |
| 2016/0321924 | A1* | 11/2016 | Lewis ................... B60W 30/02 |
| 2017/0200197 | A1 | 7/2017 | Brubaker |
| 2018/0037267 | A1 | 2/2018 | Williams et al. |
| 2018/0361916 | A1* | 12/2018 | King ........................ B60Q 1/04 |
| 2019/0283686 | A1* | 9/2019 | Gussen ................... G09F 9/301 |

FOREIGN PATENT DOCUMENTS

| | | | |
|---|---|---|---|
| KR | 10-2015-0046920 A | | 5/2015 |
| WO | 2017/103920 A1 | | 6/2017 |
| WO | 2017/180900 A1 | | 10/2017 |

* cited by examiner

INFORMATION DISPLAY SYSTEM

CROSS-REFERENCE TO RELATED APPLICATION(S)

The present application claims priority to and incorporates by reference the entire contents of Japanese Patent Application No. 2018-242217 filed in Japan on Dec. 26, 2018.

BACKGROUND OF THE INVENTION

1. Field of the Invention

The present invention relates to an information display system.

2. Description of the Related Art

Examples of a conventional information display system mounted on a vehicle include Japanese Patent Application Laid-open No. 2007-320339, which discloses a vehicle lamp assembly. The vehicle lamp assembly has a light source accommodated in a housing and the housing is attached to a front part of an upper surface of a vehicle roof. The light source irradiates the outside with light. The housing has high signal transmission capability. This vehicle lamp assembly has the housing attached to the front part of the upper surface of the vehicle roof, and has at least one communication unit provided inside the housing. The at least one communication unit is a signal receiver or a signal transmitter.

The above-described lamp assembly disclosed in Japanese Patent Application Laid-open No. 2007-320339 has room for further improvement, for example, in terms of provision of more beneficial information to the outside of a vehicle.

SUMMARY OF THE INVENTION

The present invention has been made in consideration of the above point and is aimed at providing an information display system capable of providing beneficial information to the outside of a vehicle.

In order to achieve the above mentioned object, an information display system according to one aspect of the present invention includes an antenna configured to receive outside information from an outside of a vehicle; a display unit configured to perform display to the outside of the vehicle; a processing unit capable of executing outside-targeted display processing by which to cause the display unit to perform display associated with the outside information by controlling the display unit based on the outside information received by the antenna; and a housing configured to be installed on the vehicle after having the antenna, the display unit, and the processing unit assembled thereto and thus unitized.

According to another aspect of the present invention, in the information display system, it is possible to configure that the outside information received by the antenna includes alarm information received from a preceding vehicle traveling in a front side of the vehicle in a vehicle front-rear direction thereof, and in the outside-targeted display processing, the processing unit controls the display unit based on the alarm information received by the antenna and thereby causes the display unit to perform alarm display associated with the alarm information.

According to still another aspect of the present invention, in the information display system, it is possible to configure that the antenna, the display unit, the processing unit, and the housing are provided to a rear part of the vehicle in a vehicle front-rear direction thereof, and in the outside-targeted display processing, the processing unit controls the display unit to cause the display unit to perform display to behind the vehicle in the vehicle front-rear direction.

According to still another aspect of the present invention, in the information display system, it is possible to configure that the antenna, the display unit, the processing unit, and the housing are embedded in a rear spoiler provided on a rear part of the vehicle in a vehicle front-rear direction thereof.

According to still another aspect of the present invention, in the information display system, it is possible to configure that a rear spoiler provided on a rear part of the vehicle in a vehicle front-rear direction thereof doubles as the housing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes an embodiment of the present invention in detail based on the drawings. This embodiment is not intended to limit this invention. Constituent elements in the following embodiment include those that are replaceable and easily conceivable by the skilled person or those that are substantially identical to each other.

Embodiment

Figure 1:
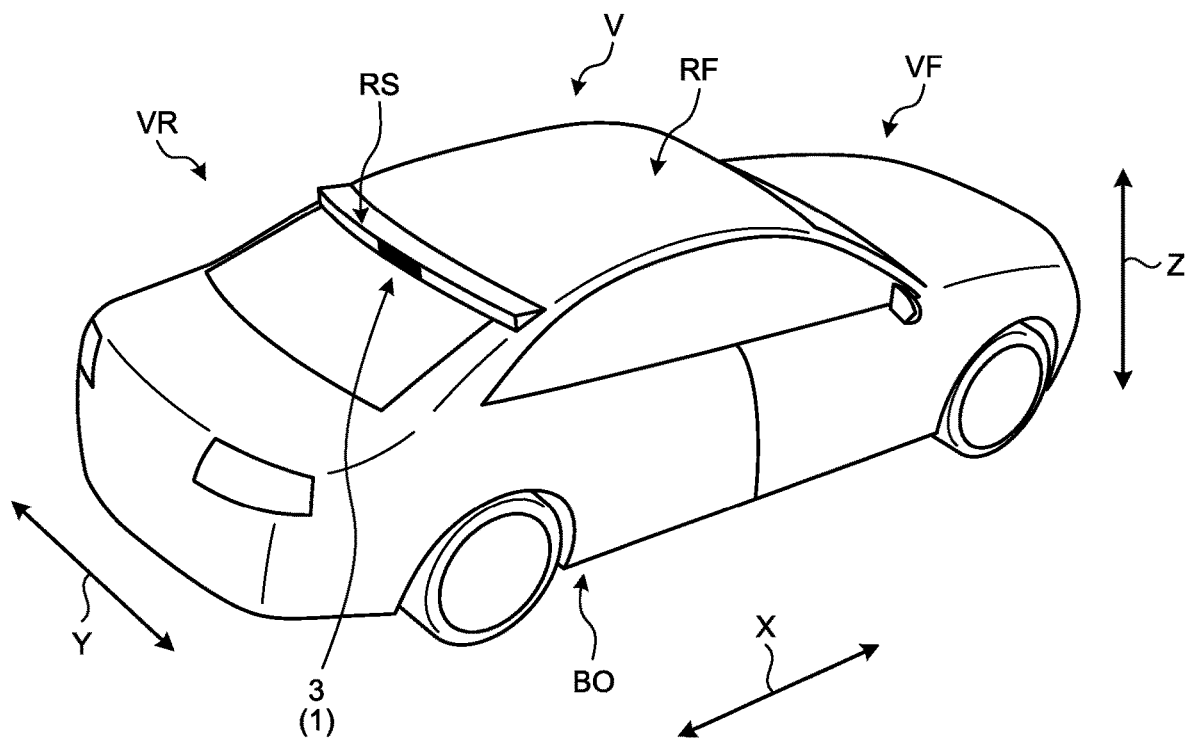
FIG. 1 is a perspective view illustrating a schematic configuration of a vehicle on which an information display system according to an embodiment is mounted.
Figure 2:
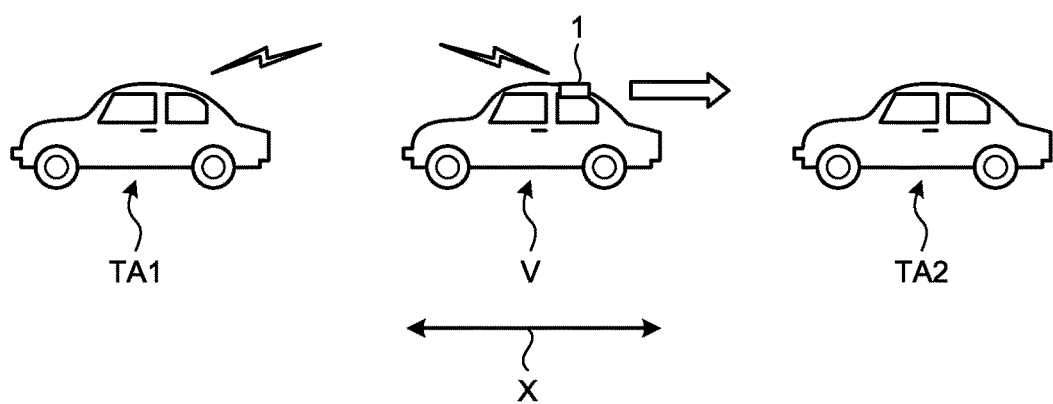
FIG. 2 is a schematic view illustrating an application example of the information display system according to the embodiment.

An information display system 1 according to the present embodiment is a vehicle-mounted system that is mounted on a vehicle V as illustrated in FIG. 1 and FIG. 2. The information display system 1 of the present embodiment constitutes a structural module for receiving outside information from an outside communication target TA1 outside of the vehicle V and for presenting information associated with the outside information to an information provision target TA2. The information display system 1 is implemented by mounting constituent elements thereof illustrated in FIG. 3 on the vehicle V. The configuration of the information display system 1 is detailed below with reference to the drawings.

In the following description, the term "vehicle front-rear direction X" of the vehicle V representatively corresponds to a direction along the entire length of the vehicle V or, in other words, corresponds to a direction in which the vehicle V travels straight forward or backward. The term "vehicle widthwise direction Y" of the vehicle V representatively corresponds to a direction along the entire width of the vehicle V, thus corresponding to a vehicle leftward or rightward direction of the vehicle V. The term "vehicle heightwise direction Z" of the vehicle V representatively corresponds to a direction along the vehicle height of the vehicle V. The vehicle front-rear direction X, which is a first direction, the vehicle widthwise direction Y, which is a second direction, and the vehicle heightwise direction Z, which is a third direction, perpendicularly intersect one another. With the vehicle V placed on a horizontal plane, the vehicle front-rear direction X and the vehicle widthwise direction Y extend along the horizontal direction, and the vehicle heightwise direction Z extends along the vertical direction. The following description may use the term "front" to indicate a side toward which the vehicle V moves when going forward and the term "rear" to indicate a side toward which the vehicle V moves when going backward, in the vehicle front-rear direction X. The following description may use the term "vehicle front part VF" to indicate a front part of the vehicle V in the vehicle front-rear direction X and the term "vehicle rear part VR" to indicate a rear part of the vehicle V in the vehicle front-rear direction X. Furthermore, the following description may use the term "upper" to indicate an upper side in the vertical direction and the term "lower" to indicate a lower side in the vertical direction, in the vehicle heightwise direction Z. Directions used in the following description are intended to indicate directions in a state in which relevant members are assembled to one another.

Each of the outside communication target TA1 and the information provision target TA2 of the present embodiment is representatively a vehicle (another vehicle) other than the vehicle (subject vehicle) V that has the information display system 1 mounted thereon. The following description illustrates, as an example, a case in which, while the outside communication target TA1 is a preceding vehicle traveling in front of the vehicle V in the vehicle front-rear direction X, the information provision target TA2 is a following vehicle traveling in the rear of the vehicle V in the vehicle front-rear direction X.

The vehicle V that has the information display system 1 mounted thereon may be any vehicle that uses a motor or an engine as a drive source thereof, such as an electric vehicle (EV), a hybrid electric vehicle (HEV), a plug-in hybrid electric vehicle (PHEV), a gasoline-powered vehicle, or a diesel-powered vehicle. The vehicle V may be operated under any control scheme such as human-controlled driving by a driver, semi-autonomous driving, or completely autonomous driving. Furthermore, the vehicle V may be what is called a private vehicle owned by an individual person, a rental car, a shared car, a bus, a taxi, or a car for ride-sharing.

Figure 3:
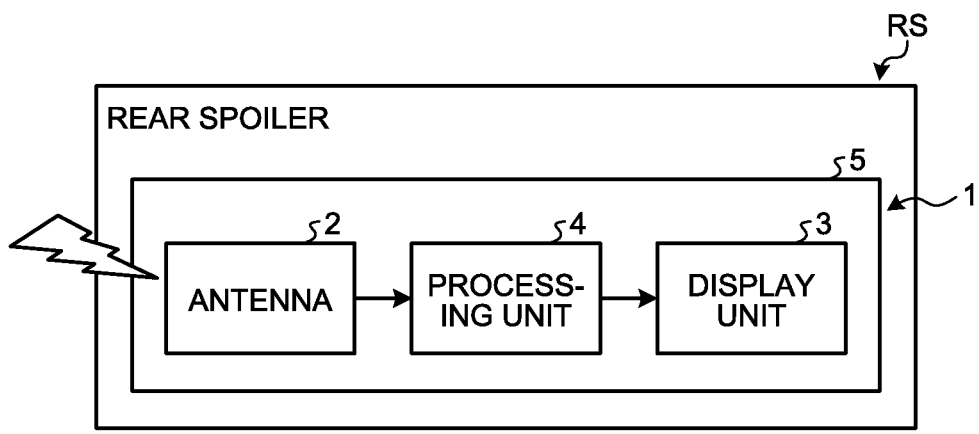
FIG. 3 is a block diagram illustrating a schematic configuration of the information display system according to the embodiment.

Specifically, the information display system 1 includes an antenna 2, a display unit 3, a processing unit 4, and a housing 5 as illustrated in FIG. 3. The antenna 2, the display unit 3, and the processing unit 4 are assembled to the housing 5 and thus unitized, thereby forming a communication and display module.

The antenna 2, the display unit 3, the processing unit 4, and the housing 5 of the present embodiment are provided in the vehicle rear part VR (see FIG. 1). More specifically, the antenna 2, the display unit 3, the processing unit 4, and the housing 5 of the present embodiment are embedded in a rear spoiler RS provided in the vehicle rear part VR (see FIG. 1). Herein, the rear spoiler RS is what is called an aerodynamic part for reducing lift force acting on the vehicle V and is provided on a body BO of the vehicle V in a manner exposed to the outside. The rear spoiler RS is formed of a material such as a resin material that does not obstruct the antenna 2 transmitting and receiving electromagnetic waves. The rear spoiler RS is provided on a section of the vehicle V that is relatively suitable for transmitting and receiving electromagnetic waves, for example, on a rear end portion (see FIG. 1) of a roof member RF forming a part of the body BO in the vehicle front-rear direction X or on the upper side of a trunk in the vehicle rear part VR.

The antenna 2 transmits and receives electromagnetic waves to and from the outside communication target TA1 present outside of the vehicle V to communicate with the outside communication target TA1, thereby transmitting thereto and receiving therefrom various pieces of information. The type of the antenna 2 may be selected from various types. The antenna 2 may be an antenna of any type such as a balanced antenna that has electric charge symmetrically distributed or an unbalanced antenna that has electric charge asymmetrically distributed. The antenna 2 may be, for example, an antenna of any type such as a planar antenna, a microstrip antenna (patch antenna), an inverted-F antenna, or a dipole antenna. In this example, a planar antenna is preferably used as the antenna 2 because such an antenna is easily embedded in a narrow and small space like the rear spoiler RS.

Electromagnetic waves transmitted and received by the antenna 2 may include, for example, electromagnetic waves in various frequency bands used in applications such as: radio (such as amplitude modulation (AM) and frequency modulation (FM)) broadcasting; digital television (DTV) (such as 2K, 4K, and 8K) broadcasting; telecommunication (personal communications service (PCS), code-division multiple access (CDMA), Long-Term Evolution (LTE), WiMAX (registered trademark), 4G, and 5G); satellite communication (global navigation satellite systems GNSSs (such as a global positioning system (GPS), a global navigation satellite system (GLONASS), and Galileo)); vehicle-to-infrastructure (V2I) communication; vehicle-to-everything (V2X) communication; electronic toll collection (ETC) or dedicated short range communication (DSRC); VICS (registered trademark); wireless local area networks (LANs); millimeter-wave communication; Wi-Fi (registered trademark); and Bluetooth (registered trademark). The antenna 2 of the present embodiment is representatively configured so as to include a V2X communication capable antenna that transmits and receives information via electromagnetic waves to and from the preceding vehicle serving as the outside communication target TA1.

The antenna 2 of the present embodiment receives the outside information from the outside communication target TA1. The outside information is information transmitted from the outside communication target TA1 and received by the antenna 2, and is information to be used for outside-targeted display processing that is described later. The outside information may include, for example, another-vehicle state information and surrounding condition information. Another-vehicle state information is information that indicates a state of another vehicle (the preceding vehicle) serving as the outside communication target TA1. The surrounding condition information is information that indicates a surrounding condition of another vehicle (the preceding vehicle) serving as the outside communication target TA1. The another-vehicle state information may include, for example, information on another vehicle such as: vehicle speed information; acceleration (such as vehicle front-rear direction acceleration, vehicle widthwise direction acceleration, and vehicle roll direction acceleration) information; steering angle information; accelerator-pedal operation amount (accelerator pedaling amount) information; brake-pedal operation amount (brake pedaling amount) information; shift-lever position information; current location information (GPS information); current-value and voltage-value information for various units; stored-power amount information for a power storage device; and direction indicator (blinker) information. The another-vehicle state information may further include information on a passenger of another vehicle such as: vital signs such as the heart rate, the respiratory rate, the pulse rate, the blood pressure, the body temperature, the brain waves, and the muscle current; individual identification information with which an individual can be identified such as fingerprint information, vein information, facial feature information, voiceprint information, and iris information; and biological information such as blood sugar level information, blood-alcohol level, electrocardiogram information, consciousness level information, face and eye direction information, and eyelid closure degree information. The surrounding condition information may include, for example, information such as: surrounding image information obtained by capturing images of an environment surrounding another vehicle or outside objects near another vehicle such as a person, a vehicle, and an obstacle; outside object information such as the presence of an outside object and a relative distance to, a relative speed with respect to, and a time-to-collision (TTC) with the outside object; white line information on a lane in which another vehicle travels; traffic information on a traveling route that is being taken by another vehicle; and information on environmental conditions of the current location of another vehicle V such as a weather condition, whether it is raining, whether the sun is shining, the intensity of illumination of sunlight, and an air temperature.

The outside information that the antenna 2 of the present embodiment receives includes alarm information received from the preceding vehicle serving as the outside communication target TA1. The alarm information is representatively information indicating that an event that needs the following vehicle serving as the information provision target TA2 to be notified of has occurred. The alarm information is, for example, information indicating, as an event alarming to the following vehicle, that a driver of the preceding vehicle serving as the outside communication target TA1 has fallen ill, that an accident or a traffic jam has occurred ahead of a preceding vehicle serving as the outside communication target TA1, or that a disaster such as an earthquake, a fire, a tornado or a flood has occurred.

The display unit 3 is an information display unit for displaying information to the outside of the vehicle V. The display unit 3 is formed of an indicating lamp, an indicator or character display unit (signboard), or an image display apparatus. The indicating lamp is formed of a light-emitting element such as a light bulb or a light emitting diode (LED). The indicator or character display unit is obtained by arranging a plurality of light-emitting element. Examples of the image display apparatus include a liquid crystal display, a plasma display, and an organic EL display for displaying images. The following description assumes, as an example, the display unit 3 of the present embodiment to be configured to double as what is called a high mount stop lamp (HMSL). The HMSL is an indicating lamp provided on the vehicle rear part VR of the vehicle V (see FIG. 1). The HMSL is representatively an indicating lamp that is lit during braking operation of the vehicle V. The HMSL that is configured to double as the display unit 3 is provided in the rear spoiler RS on the vehicle rear part VR as illustrated above, and performs display toward a following vehicle that is the information provision target TA2 traveling behind the vehicle V in the vehicle front-rear direction X. The HMSL that is configured to double as the display unit 3 is representatively lit, during the outside-targeted display processing that is described later, in a display form (lighting form) different from a display form in which the display unit 3 is light during the braking operation.

The processing unit 4 integrally controls units included in the information display system 1. The processing unit 4 receives the outside information from the outside communication target TA1 outside of the vehicle V and executes various arithmetic processing for presenting information associated with the outside information to the information provision target TA2. The processing unit 4 of the present embodiment has the function of executing, based on the outside information received by the antenna 2, the outside-targeted display processing that is described later. The processing unit 4 is configured by including electronic circuits that mainly include a known microcomputer that includes a central arithmetic processor such as a central processing unit (CPU), a read only memory (ROM), a random access memory (RAM), and an interface. The processing unit 4 has the antenna 2 and the display unit 3 electrically connected thereto. The processing unit 4 is capable of exchanging various electrical signals between different units.

Figure 4:
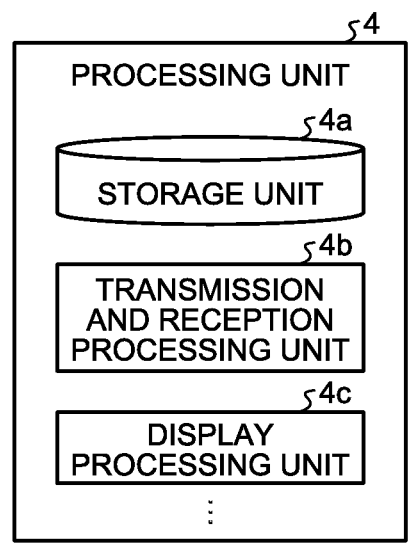
FIG. 4 is a block diagram illustrating a schematic configuration of a processing unit in the information display system according to the embodiment.

Specifically, as illustrated in FIG. 4 as an example, the processing unit 4 functionally conceptually includes a storage unit 4a, a transmission and reception processing unit 4b, and a display processing unit 4c.

The storage unit 4a is a part that stores therein various kinds of information. The storage unit 4a has, for example, the following stored therein: conditions and information that are needed for various processing in the processing unit 4; various computer programs and applications to be executed by the processing unit 4; and control data. The storage unit 4a is capable of temporarily storing therein the outside information received by the antenna 2. The storage unit 4a has display information stored therein that indicates display contents to be displayed by the display unit 3 in the outside-targeted display processing that is described later. From the storage unit 4a, these kinds of information are read out by units such as the transmission and reception processing unit 4b and the display processing unit 4c when needed.

The transmission and reception processing unit 4b and the display processing unit 4c are parts that execute the various computer programs stored in the storage unit 4a, output output signals as a result of causing the computer programs to run, and consequently execute various kinds of processing for implementing various functions.

The transmission and reception processing unit 4b controls the antenna 2 to execute processing related to information transmission and reception via the antenna 2. The transmission and reception processing unit 4b of the present embodiment receives the outside information from the outside communication target TA1 via the antenna 2 and stores the outside information in the storage unit 4a.

The display processing unit 4c controls the display unit 3 to execute processing related to information display to be performed by the display unit 3. The display processing unit 4c of the present embodiment controls the display unit 3 and executes the outside-targeted display processing. Herein, the outside-targeted display processing is processing that controls the display unit 3 based on the outside information received by the antenna 2 and stored in the storage unit 4a and causes the display unit 3 to perform display associated with the outside information. In the outside-targeted display processing, the display processing unit 4c reads out, from the storage unit 4a, display information that indicates a display content corresponding to the outside information received by the antenna 2 and causes the display unit 3 to display the display information, thereby causing the display unit 3 to perform display associated with the outside information.

In the outside-targeted display processing, as illustrated above, the display processing unit 4c controls the HMSL that doubles as the display unit 3 and implements display in a display form (lighting form) different from a display form when implementing display during the braking operation of the vehicle V. The HMSL that doubles as the display unit 3 can be lit in different display forms (lighting forms) thereof, for example, by applying different features in terms of any of flashing pattern, flashing cycle, lighting color, and the like to the HMSL. That is, the display processing unit 4c, for example, can make the display form in the outside-targeted display processing and the display form during the braking operation of the vehicle V different from each other by applying different features in terms of any of flashing pattern, flashing cycle, lighting color, and the like to the display unit 3 (HMSL).

More specifically, in the outside-targeted display processing, the display processing unit 4c of the present embodiment controls the display unit 3 based on alarm information included in the outside information received by the antenna 2 and thereby causes the display unit 3 to perform alarm display associated with the alarm information. In the outside-targeted display processing, the display processing unit 4c controls the display unit 3 to cause the display unit 3 to perform alarm display to a following vehicle traveling behind the vehicle V in the vehicle front-rear direction X and serving as the information provision target TA2. In the outside-targeted display processing, the display processing unit 4c can change a display form (lighting form) to another in accordance with the kind of event (such as illness of a driver of a preceding vehicle, a traffic jam or an accident ahead of a preceding vehicle, or an disaster such as an earthquake, a fire, a tornado, or a flood) signified by the alarm information. Each display form is a combination of features such as a flashing pattern, a flashing cycle, and a lighting color. In the outside-targeted display processing, the display processing unit 4c reads out, from the storage unit 4a, display information that indicates a display content corresponding to alarm information and causes the display unit 3 to display the display information, thereby causing the display unit 3 to perform display associated with the alarm information.

The housing 5 is configured to be installed on the vehicle V after having the antenna 2, the display unit 3, and the processing unit 4 assembled to the housing 5 and thus unitized. The housing 5 is formed of, for example, insulating synthetic resin. The housing 5 may be composed of, for example, a plurality of members combined together. The housing 5 has the antenna 2, the display unit 3, and the processing unit 4 assembled thereto and thus unitized as the information display system 1. The antenna 2, the display unit 3, the processing unit 4, and the housing 5 are embedded in the rear spoiler RS (see FIG. 1) as described above in the thus unitized state. In a state embedded in the rear spoiler RS, the antenna 2, the display unit 3, the processing unit 4, and the housing 5 are provided in the rear spoiler RS with the display unit 3 exposed to the outside and facing rearward in the vehicle front-rear direction X.

The information display system 1 embedded in the rear spoiler RS as described above receives power supplied from a power supply of the vehicle V, whereby members therein are driven. A scheme for connecting constituent elements to one another for supplying power thereto is either wired connection using wiring members such as an electrical wire or wireless connection such as non-contact power supply.

In principle, the information display system 1 configured as described above can complete the outside-targeted display processing only based on the outside information received by the antenna 2. That is, in a state independent of a vehicle control system that integrally control the entire vehicle V, the information display system 1 can execute the outside-targeted display processing without receiving various information from the vehicle control system. In other words, the information display system 1 allows the processing unit 4 to directly process the outside information received by the antenna 2 without any other control apparatus or the like mediating therebetween and the display unit 3 to then perform processing associated with the outside information. The information display system 1 may can also be configured to limit the use of the outside information received by the antenna 2 to only within the information display system 1, not to provide the outside information to the vehicle control system, and limit the use thereof to the outside-targeted display processing. That is, the information display system 1 can be configured as a system independent of the vehicle control system and self-contained except in the aspect of a power supply. The information display system 1 may further include a power supply such as power storage apparatus or a power generating apparatus (for example, a solar panel) dedicated to the information display system 1, thus can also be configured as a system independent of the vehicle control system and self-contained in every aspect including a power supply.

Figure 5:
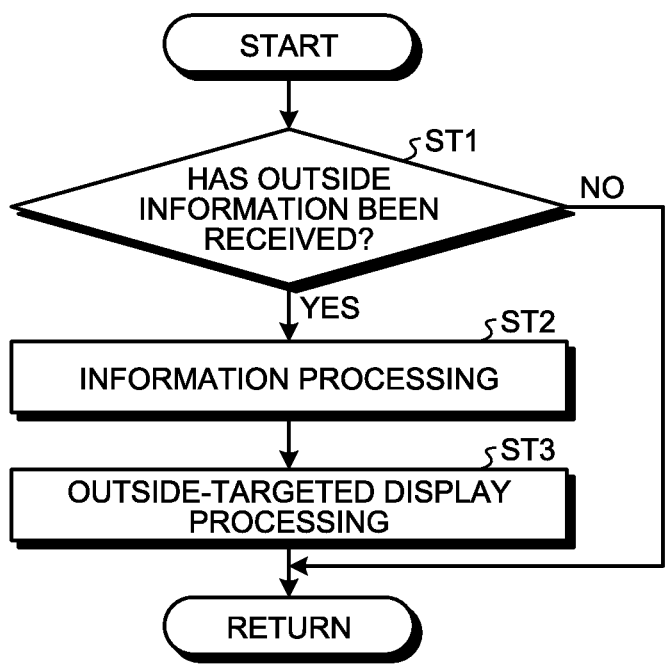
FIG. 5 is a flowchart illustrating an example of control that the information display system according to the embodiment performs.

Next, the outline of an example of control by the information display system 1 is described with reference to a flowchart in FIG. 5. These control routines are repeatedly executed, for example, in control cycles (clock units) of several milliseconds to several tens of milliseconds.

The transmission and reception processing unit 4b in the processing unit 4 determines whether outside information has been received by the antenna 2 (step ST1). Upon determining that no outside information has been received (No at step ST1), the transmission and reception processing unit 4b ends the current control cycle and shifts the processing to the subsequent control cycle.

Upon determining that the outside information has been received (Yes at step ST1), the transmission and reception processing unit 4b in the processing unit 4 performs various processing on the outside information and stores the outside information into the storage unit 4a (step ST2).

Subsequently, based on the outside information received and processed in the processing at step ST2, the display processing unit 4c in the processing unit 4 executes the outside-targeted display processing by which to control the display unit 3 to cause the display unit 3 to perform display associated with the outside information (step ST3), then ends the current control cycle, and then shifts the processing to the subsequent control cycle.

The information display system 1 described above is capable of executing the outside-targeted display processing in such a manner that the antenna 2, the display unit 3, and the processing unit 4 unitized via the housing 5 installed on the vehicle V function in cooperation with one another. Herein, the outside-targeted display processing is processing to be executed by the processing unit 4 and is processing to control the display unit 3 based on outside information received by the antenna 2 to cause the display unit 3 to perform display associated with the outside information. That is, the information display system 1 is capable of displaying and providing, to the surroundings thereof outside information, outside information acquired from the outside of and by the vehicle V that has the information display system 1 mounted thereon. As a result, the information display system 1 can provide beneficial information to the outside of the vehicle V. Thus, for example, the information display system 1 is capable of, based on outside information acquired by the vehicle V, appropriately providing beneficial information to a target such as another vehicle or a pedestrian even if the target does not have a communication system that connects the target to the outside thereof.

The information display system 1 is installed on the vehicle V with the antenna 2, the display unit 3, and the processing unit 4 unitized by the housing 5, thus having the antenna 2, the display unit 3, and the processing unit 4 arranged close to one another. As a result, the information display system 1 can reduce, as much as possible, wiring members connecting the antenna 2, the display unit 3, and the processing unit 4 to one another. The information display system 1 allows the processing unit 4 to directly process outside information received by the antenna 2 without any other control apparatus or the like mediating therebetween and the display unit 3 to then perform processing associated with the outside information, thus being capable of preventing, for example, delay in operation. The information display system 1 is installed on the vehicle V with the antenna 2, the display unit 3, and the processing unit 4 unitized by the housing 5, thus allowing for enhancement in ease of assembly of the information display system 1 to the vehicle V and, for example, allowing the information display system 1 to be easily added to a completed vehicle. In addition, the information display system 1 is capable of providing beneficial information to the outside of the vehicle V as described above.

Furthermore, in the outside-targeted display processing by the processing unit 4, the information display system 1 described above controls the display unit 3 based on alarm information included in the outside information received by the antenna 2 from a preceding vehicle serving as the outside communication target TA1 and thereby causes the display unit 3 to perform alarm display associated with the alarm information. As a result, the information display system 1 can function as an alarm system that performs alarm display to the outside of the vehicle V. Thus, for example, the information display system 1 is capable of, based on alarm information acquired by the vehicle V from a preceding vehicle serving as the outside communication target TA1, appropriately notifying a target such as another vehicle or a pedestrian that an alarm event has occurred, even if the target does not have a communication system that connects the target to the outside thereof.

In the outside-targeted display processing by the processing unit 4, the information display system 1 described above further controls the display unit 3 to cause the display unit 3 to perform display to behind the vehicle V in the vehicle front-rear direction X thereof. As a result, the information display system 1 is capable of providing beneficial information based on outside information acquired by the vehicle V to a following vehicle that tends to have a frontward view thereof in the vehicle front-rear direction X obstructed by the vehicle V that has the information display system 1 mounted thereon.

Furthermore, the information display system 1 described above has the antenna 2, the display unit 3, the processing unit 4, and the housing 5 are embedded in the rear spoiler RS provided on the vehicle rear part VR in the unitized state. This configuration allows the information display system 1 to have the antenna 2, the display unit 3, the processing unit 4, and the housing 5 provided in a position in the vehicle V that is relatively easy to have a member added to a completed vehicle, that has a relatively favorable electromagnetic wave condition, and that is relatively easy to be visually recognized from a following vehicle.

The information display system described above according to the embodiment of the present invention is not limited to the embodiment described above and can be changed in various manners without departing from the scope of claims.

Figure 6:
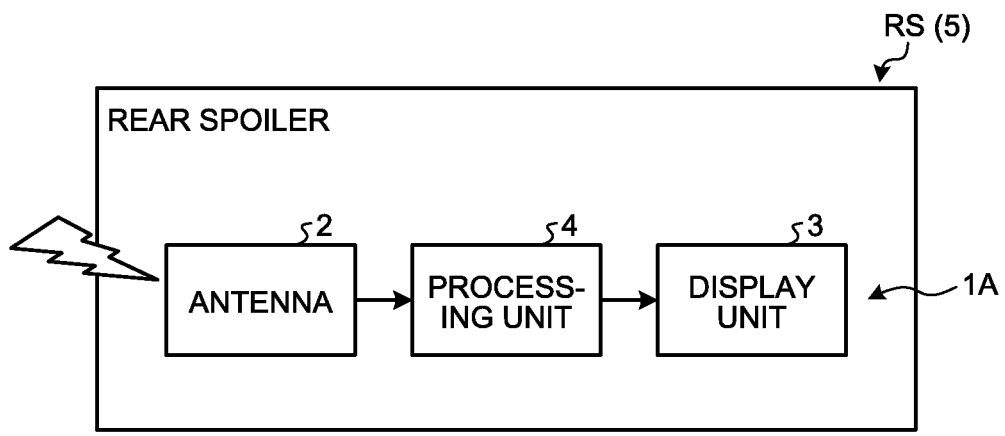
FIG. 6 is a block diagram illustrating a schematic configuration of an information display system according to a modification.

The above description assumes the housing 5 to be embedded in the rear spoiler RS. However, this is not a limiting example. In an information display system 1A according to a modification, illustrated in FIG. 6, the rear spoiler RS doubles as the housing 5. The information display system 1A is unitized by having the antenna 2, the display unit 3, and the processing unit 4 assembled directly to the rear spoiler RS that doubles as the housing 5 and is installed on the vehicle rear part VR of the vehicle V. Even in this case, the information display system 1A can provide beneficial information to the outside of the vehicle V. In this case, the information display system 1A can be provided with a reduced number of constituent components, thereby, for example, being enabled to be reduced in weight and manufacturing cost.

Figure 7:
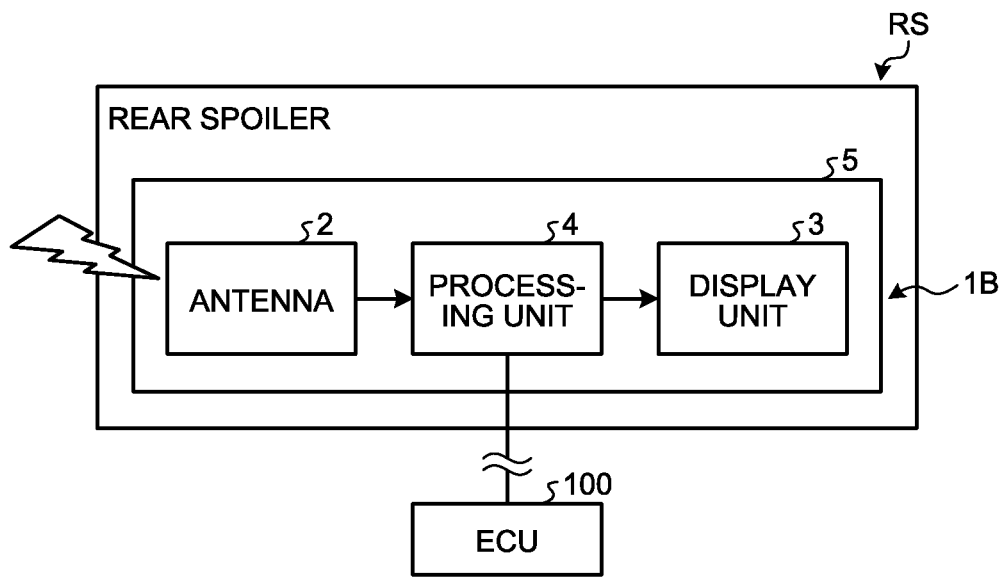
FIG. 7 is a block diagram illustrating a schematic configuration of an information display system according to another modification.

The above description assumes that the information display system 1 can be configured as a system independent of the vehicle control system that integrally controls the entire vehicle V and self-contained except in the aspect of a power supply. However, this is not a limiting example. An information display system 1B according to another modification illustrated in FIG. 7 has the processing unit 4 electrically connected also to an electronic control unit (ECU) 100 via a vehicle-mounted network, thereby being configured to exchange various electrical signals with the ECU 100. The ECU 100 is an electric control unit and serves as a part of the vehicle control system that integrally controls the entire vehicle V. In this case, the information display system 1B may use not only outside information received by the antenna 2 but also information acquired from the ECU 100 in the outside-targeted display processing described above. That is, the information display system 1B may be configured to receive various kinds of information from the ECU 100 in cooperation with the above vehicle control system and execute the outside-targeted display processing. In this case, the information display system 1B may be configured to provide outside information received by the antenna 2 not only to within the information display system 1B but also to the vehicle control system to allow the ECU 100 to use the outside information for processing other than the outside-targeted display processing. Even in this case, the information display system 1B can provide beneficial information to the outside of the vehicle V. Furthermore, in this case, the information display system 1B can provide more beneficial information to the outside of the vehicle V in cooperation with the ECU 100 in the vehicle control system side, and can also provide the outside information received by the antenna 2, for example, to a passenger of the vehicle V.

Figure 8:
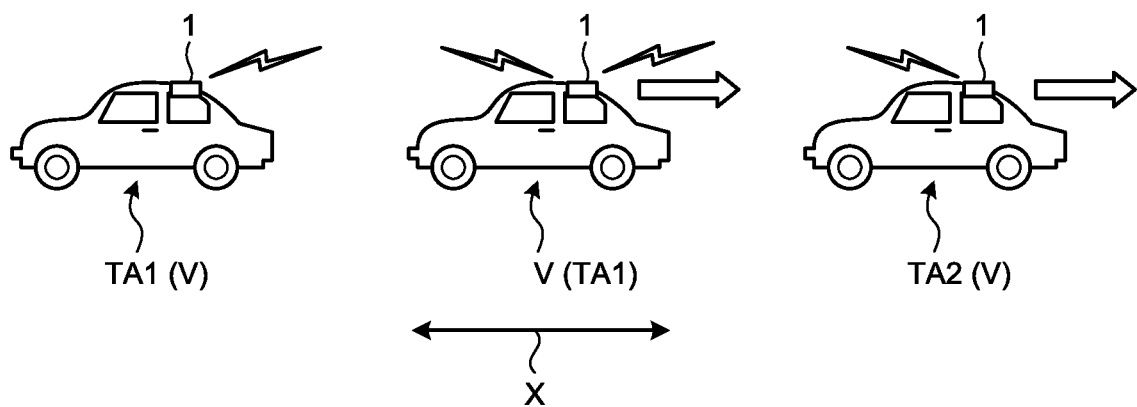
FIG. 8 is a schematic view illustrating an application example of an information display system according to still another modification.

The above description assumes the information display system 1 to be mounted on the vehicle V that is a subject vehicle. However, as in the case of a modification illustrated in FIG. 8, the information display systems 1 may be mounted on respective vehicles other than the vehicle V that are a preceding vehicle serving as the outside communication target TA1 and a following vehicle serving as the information provision target TA2 herein. In this case, the antenna 2 may be configured to not only receive outside information from the outside communication target TA1 but also transmit various kinds of information including the outside information to the outside. For example, the information display system 1 may be configured to not only execute the outside-targeted display processing based on outside information received from a preceding vehicle serving as the outside communication target TA1 but also transmit the outside information to a following vehicle serving as the information provision target TA2. That is, in this case, the vehicle V that has received outside information from a preceding vehicle serving as the outside communication target TA1 and performed the outside-targeted display processing serves as the outside communication target TA1 for a following vehicle serving as the information provision target TA2 for the vehicle V. The information display system 1 mounted on the vehicle V (the following vehicle) that has been the information provision target TA2 may execute the outside-targeted display processing based on outside information received thereby. That is, the respective information display systems 1 may be configured to transmit and receive outside information by causing a plurality of vehicles V that have the corresponding information display systems 1 mounted thereon to cooperate with one another and execute the outside-targeted display processing in the corresponding vehicles V. In this case, outside information that is transmitted by each of the vehicle V to the corresponding information provision target TA2 may include, in addition to outside information on the vehicle V that is a subject vehicle, outside information received from a preceding vehicle thereof serving as the outside communication target TA1.

The information display system 1 described above may be configured to further include an outside camera (for example, a dashboard camera) that captures an image of the outside of the vehicle V. In this case, the outside camera may be unitized together with the antenna 2, the display unit 3, and the processing unit 4 by the housing 5, and the antenna 2 may be configured to transmit image information indicating an image captured by the outside camera to the outside (for example, an outside server).

The above description assumes each of the outside communication target TA1 and the information provision target TA2 to be a vehicle (another vehicle) other than the vehicle (subject vehicle) V that has the information display system 1 mounted thereon. However, this is not a limiting example. Any target that is located outside of the vehicle V and that is capable of communicating with information display system 1 may serve as the outside communication target TA1. Such a target may be, for example, a vehicle other than a preceding vehicle (such as a following vehicle or a side-by-side traveling vehicle), an on-street device, a communication satellite, a communication base station, or an outside server. Any target that is located outside of the vehicle V may serve as the information provision target TA2. Such a target may be, for example, a vehicle other than a following vehicle (such as a preceding vehicle or a side-by-side traveling vehicle) or a pedestrian. In this case, the information display system 1 may be provided in a side of the vehicle V that is be relatively close to a position in which the information provision target TA2 is more likely to be present, for example, may be provided not in the rear spoiler RS on the vehicle rear part VR but in a hood in the vehicle front part VF or in a door panel on a lateral side of the vehicle.

The above description assumes that outside information that the antenna 2 receives includes alarm information received from a preceding vehicle serving as the outside communication target TA1. However, this is not a limiting example. The above description also assumes that, in the outside-targeted display processing, the processing unit 4 reads out, from the storage unit 4a, display information that indicates a display content corresponding to alarm information and causes the display unit 3 to display the display information thus read out, thereby causing the display unit 3 to perform display associated with the alarm information. However, this is not a limiting example. The processing unit 4 may be configured to perform more sophisticated arithmetic processing in the outside-targeted display processing. For example, in the outside-targeted display processing, the processing unit 4 may be configured to analyze information such as surrounding image information included in the outside information received by the antenna 2 and cause the display unit 3 to display a display content corresponding to the result of the analysis, thereby causing the display unit 3 to perform display associated with the outside information (information such as the surrounding image information). In another example, in the outside-targeted display processing, the processing unit 4 analyzes, for example, information such as outside object information included in outside information received by the antenna 2 from a following vehicle serving as the outside communication target TA1 and calculates the relative speed between the vehicle V that is a subject vehicle and a following vehicle. The processing unit 4 may be configured to then cause the display unit 3 to display a display content corresponding to the relative speed thus calculated, thereby causing the display unit 3 to perform display associated with the outside information (information such as the outside object information). In this case, the display unit 3 is not limited to an indicating lamp such as the HMSL described above and another unit may be used therefor. Examples of the unit include an indicator, a character display unit, and an image display apparatus, which are capable of displaying more detailed information.

The information display system according to the present embodiment may be configured by appropriately combining constituent elements from the embodiment and the modification.

The information display system according to the present embodiment is capable of executing the outside-targeted display processing in such a manner that an antenna, a display unit, and a processing unit unitized via a housing installed on a vehicle function in cooperation with one another. Herein, the outside-targeted display processing is processing to be executed by the processing unit and is processing to control the display unit based on outside information received by the antenna to cause the display unit to perform display associated with the outside information. As a result, the information display system produces the effect of enabling beneficial information to be provided to the outside of the vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information display system comprising:
    an antenna configured to receive outside information from an outside of a vehicle;
    a display unit configured to perform display to the outside of the vehicle;
    a processing unit configured to execute outside-targeted display processing by which to cause the display unit to perform display associated with the outside information by controlling the display unit based on the outside information received by the antenna; and
    a housing configured to be installed on an outside of the vehicle after having the antenna, the display unit, and the processing unit assembled thereto and thus unitized, wherein
    the antenna is configured to receive the outside information from a preceding vehicle traveling in a front side of the vehicle in a vehicle front-rear direction thereof,
    in addition to the outside information received from the preceding vehicle, the antenna is configured to transmit information on the vehicle as the outside information to a following vehicle traveling in a rear side of the vehicle in the vehicle front-rear direction thereof,
    the outside information received by the antenna, includes alarm information received from the preceding vehicle,
    the alarm information is information indicating, as an event alarming to the following vehicle, that a driver of the preceding vehicle has fallen ill or that a disaster has occurred, and
    the processing unit, in the outside-targeted display processing, controls the display unit based on the alarm information received by the antenna, thereby causes the display unit to perform alarm display associated with the alarm information and, change a display from the alarm display in accordance with a kind of event signified by the alarm information.

2. The information display system according to claim 1, wherein
    the antenna, the display unit, the processing unit, and the housing are provided to a rear part of the vehicle in the vehicle front-rear direction thereof, and
    in the outside-targeted display processing, the processing unit controls the display unit to cause the display unit to perform display to behind the vehicle in the vehicle front-rear direction.

3. The information display system according to claim 1, wherein
    the antenna, the display unit, the processing unit, and the housing are embedded in a rear spoiler provided on a rear part of the vehicle in the vehicle front-rear direction thereof.

4. The information display system according to claim 2, wherein
    the antenna, the display unit, the processing unit, and the housing are embedded in a rear spoiler provided on a rear part of the vehicle in the vehicle front-rear direction thereof.

5. The information display system according to claim 1, wherein
    a rear spoiler provided on a rear part of the vehicle in the vehicle front-rear direction thereof doubles as the housing.

6. The information display system according to claim 2, wherein
    a rear spoiler provided on a rear part of the vehicle in the vehicle front-rear direction thereof doubles as the housing.

7. The information display system according to claim 1, wherein
    the outside information received by the antenna includes another-vehicle state information received from the preceding vehicle, and
    the another-vehicle state information is information that indicates a state of the preceding vehicle.

8. The information display system according to claim 1, wherein
    the outside information received by the antenna includes surrounding condition information received from the preceding vehicle, and
    the surrounding condition information is information that indicates a surrounding condition of the preceding vehicle.

* * * * *